United States Patent
Burrill et al.

(10) Patent No.: US 7,333,918 B2
(45) Date of Patent: Feb. 19, 2008

(54) SYSTEM AND METHOD FOR CALCULATING PART LIFE

(75) Inventors: Garth Burrill, Charlotte, NC (US); Thomas Christiansen, Waxhaw, NC (US); Salvatore A. DellaVilla, Jr., Charlotte, NC (US); Kevin Dunn, Stanley, NC (US); Robert Steele, Jr., Charlotte, NC (US); David Turpin, Charlotte, NC (US)

(73) Assignee: Strategic Power Systems, Inc., Charlotte, NC (US)

( * ) Notice: Subject to any disclaimer, the term of this patent is extended or adjusted under 35 U.S.C. 154(b) by 314 days.

(21) Appl. No.: 10/403,629

(22) Filed: Mar. 31, 2003

(65) Prior Publication Data
US 2004/0049480 A1 Mar. 11, 2004

Related U.S. Application Data (60) Provisional application No. 60/408,428, filed on Sep. 5, 2002.

(51) Int. Cl.
  *G06F 11/30* (2006.01)
  *G06F 17/40* (2006.01)
(52) U.S. Cl. .................. 702/184; 702/176; 702/177; 702/183; 702/187; 702/188
(58) Field of Classification Search ............... 700/108; 702/187–188, 182–184, 176–177
See application file for complete search history.

(56) References Cited

U.S. PATENT DOCUMENTS

| | | | |
|---|---|---|---|
| 4,490,806 A | 12/1984 | Enke et al. | |
| 4,888,812 A | 12/1989 | Dinan et al. | |
| 4,937,740 A | 6/1990 | Agarwal et al. | |
| 4,956,808 A | 9/1990 | Aakre et al. | |
| 5,224,212 A | 6/1993 | Rosenthal et al. | |
| 6,189,069 B1 | 2/2001 | Parkes et al. | |
| 6,282,546 B1 | 8/2001 | Gleichauf et al. | |

(Continued)

FOREIGN PATENT DOCUMENTS

WO    WO 02/103177    * 12/2002

OTHER PUBLICATIONS http://web.archive.org/web/20001004082946/www.spsinc.com/products_link.html.*

(Continued)

*Primary Examiner*—Ryan A. Jarrett
(74) *Attorney, Agent, or Firm*—Hoffman, Warnick & D'Alessandro LLC (57) ABSTRACT

A system and method for utilizing reliability data from a plant to dynamically calculate an expended life for a selected part. A system is provided that includes a central database for storing service data for different parts of a unit within the plant, wherein the service data includes installation data and a service history of the different parts; a data collection engine for dynamically collecting operational data from the plant in a near real-time manner, wherein the operational data is collected, processed and stored independently from the central database; and a lifetime calculation engine for implementing a lifetime calculation equation for the selected part, wherein the lifetime calculation equation utilizes the service data and the operational data to determine the expended life of the selected part.

4 Claims, 10 Drawing Sheets

U.S. PATENT DOCUMENTS

| | | |
|---|---|---|
| 6,330,652 B1 | 12/2001 | Robb |
| 6,343,251 B1 * | 1/2002 | Herron et al. ............... 701/100 |
| 6,636,813 B1 * | 10/2003 | Isobe et al. .................... 702/34 |
| 7,065,471 B2 * | 6/2006 | Gotoh et al. ................. 702/183 |
| 2001/0039579 A1 | 11/2001 | Trcka et al. |
| 2002/0049746 A1 | 4/2002 | De Roose |
| 2002/0120412 A1 * | 8/2002 | Hayashi et al. ............... 702/61 |
| 2003/0084019 A1 * | 5/2003 | Woodmansee ................. 707/1 |
| 2005/0085989 A1 * | 4/2005 | Martin ....................... 701/100 |

OTHER PUBLICATIONS

Hoeft, R. and E. Gebhardt, "Heavy-Duty Gas Turbine Operating and Maintenance Considerations," GE Power Systems, Publication # GER-3620G, Sep. 2000.

* cited by examiner

ORAP LINK
REAL TIME PLANT PRODUCTION DATA

| PLANT | CURRENT TIME | TOTAL MW's | TOTAL MVAR's | FUEL TYPE | TOTAL GAS FUEL (kpph) | TOTAL OIL FUEL (gpm) | NOX (ppm) | CO (ppm) |
|---|---|---|---|---|---|---|---|---|
| − PLANT 1 | 6/19/2002 10:54:10 AM | 0.00 | 3.54 | GAS | 0.64 | N/A | -0.09 | 0.00 |

| UNIT | CURRENT TIME | UNIT MW's | UNIT MVAR's | FUEL TYPE | UNIT GAS FUEL (kpph) | UNIT OIL FUEL (gpm) | NOX (ppm) | CO (ppm) |
|---|---|---|---|---|---|---|---|---|
| GT01 | 6/19/2002 10:54:10 AM | 0.00 | 3.96 | GAS | 0.03 | N/A | -0.03 | 0.00 |
| GT02 | 6/19/2002 10:54:10 AM | 0.00 | -0.72 | GAS | 0.44 | N/A | 0.14 | 0.00 |
| GT03 | 6/19/2002 10:54:14 AM | 0.00 | 0.30 | GAS | 0.17 | N/A | -0.20 | 0.00 |

| PLANT | CURRENT TIME | TOTAL MW's | TOTAL MVAR's | FUEL TYPE | TOTAL GAS FUEL (kpph) | TOTAL OIL FUEL (gpm) | NOX (ppm) | CO (ppm) |
|---|---|---|---|---|---|---|---|---|
| − PLANT 2 | 6/19/2002 9:54:59 AM | 0.00 | 0.00 | GAS | 0.00 | N/A | -0.03 | -0.06 |

| UNIT | CURRENT TIME | UNIT MW's | UNIT MVAR's | FUEL TYPE | UNIT GAS FUEL (kpph) | UNIT OIL FUEL (gpm) | NOX (ppm) | CO (ppm) |
|---|---|---|---|---|---|---|---|---|
| UNIT 1 | 6/19/2002 9:54:59 AM | 0.00 | 0.00 | GAS | 0.00 | N/A | -0.05 | 0.43 |
| UNIT 2 | 6/19/2002 9:54:59 AM | 0.00 | 0.00 | GAS | 0.00 | N/A | 0.02 | -0.49 |

| PLANT | CURRENT TIME | TOTAL MW's | TOTAL MVAR's | FUEL TYPE | TOTAL GAS FUEL (kpph) | TOTAL OIL FUEL (gpm) | NOX (ppm) | CO (ppm) |
|---|---|---|---|---|---|---|---|---|
| + PLANT 3 | 6/19/2002 9:01:32 AM | 0.00 | 3.18 | GAS | 0.01 | N/A | 0.10 | N/A |
| + PLANT 4 | 6/19/2002 10:55:41 AM | 0.00 | 2.22 | GAS | 0.88 | N/A | 0.08 | -0.33 |
| + PLANT 5 | 6/19/2002 10:54:56 AM | 0.00 | 4.11 | GAS | 0.00 | N/A | 0.56 | 0.75 |
| − PLANT 6 | 6/19/2002 10:54:44 AM | 0.00 | 0.00 | GAS | 0.08 | -1.65 | 0.00 | 0.10 |

| UNIT | CURRENT TIME | UNIT MW's | UNIT MVAR's | FUEL TYPE | UNIT GAS FUEL (kpph) | UNIT OIL FUEL (gpm) | NOX (ppm) | CO (ppm) |
|---|---|---|---|---|---|---|---|---|
| CT#1 | 6/19/2002 10:54:44 AM | 0.00 | 0.00 | GAS | 0.05 | -0.66 | 0.00 | 0.02 |
| CT#2 | 6/19/2002 10:54:46 AM | 0.00 | 0.00 | GAS | 0.02 | -0.30 | 0.00 | 0.02 |
| CT#3 | 6/19/2002 10:54:46 AM | 0.00 | 0.00 | GAS | 0.02 | -0.30 | 0.00 | 0.02 |
| CT#4 | 6/19/2002 10:54:44 AM | 0.00 | 0.00 | GAS | -0.03 | -0.30 | 0.00 | 0.02 |
| CT#5 | 6/19/2002 10:54:46 AM | 0.00 | 0.00 | GAS | 0.02 | -0.09 | 0.00 | 0.02 |

| TOTAL PRODUCTION | | 0.00 | 13.05 | GAS | 1.61 | -1.65 | 0.62 | 0.46 |
|---|---|---|---|---|---|---|---|---|

MAIN MENU
ORAP LINK
CURRENT STATUS
PLANT PRODUCTION DATA
UNIT STATUS
LOGOUT

ORAP LINK
CURRENT UNIT STATUS

MAIN MENU

ORAP LINK

CURRENT STATUS

PLANT PRODUCTION DATA

UNIT STATUS

LOGOUT

SELECT SITE:
- PLANT A
- PLANT B
- PLANT C
- PLANT D

SELECT UNIT:
- GT01
- GT02
- GT03

- ● UNIT STATUS
- ○ COUNTER READINGS
- ○ UNIT AVAILABILITY

VIEW STATUS

PLANT A
CURRENT UNIT STATUS

CURRENT SITE AMBIENT TEMPERATURES: 84 DEGREES    CURRENT SITE RELATIVE HUMIDITY: N/A%

CURRENT READINGS

|  | UNITS | GT01 | GT02 | GT03 |
|---|---|---|---|---|
| CURRENT STATUS | | | | |
| AS OF | | 6/19/2002 10:36:10 AM | 6/19/2002 10:36:10 AM | 6/19/2002 10:35:14 AM |
| UNIT RUNNING | YES/NO | NO | NO | NO |
| BREAKER STATUS | OPEN/CLOSED | OPEN | OPEN | OPEN |
| ON TURNING GEAR | YES/NO | YES | YES | YES |
| ENGINE SPEED | RPM | 3 | 3 | 3 |
| AVG. EXHAUST GAS TEMP | DEG. F° | 74 | 75 | 73 |
| BLADE PATH SPREAD | DEG. F° | 3 | 3 | 4 |
| UNIT READY TO START | YES/NO | NO | NO | NO |
| PRODUCTION | | | | |
| MW OUTPUT | MWH | 0.00 | 0.00 | 0.00 |
| MVARS | MVARH {−/+} | 3.96 | −0.72 | 0.30 |
| FUEL | | | | |
| SELECTED TYPE | GAS/OIL | GAS | GAS | GAS |
| FUEL FLOW (GAS) | KPPH | 0 | 0 | 0 |
| FUEL FLOW (OIL) | GPM | N/A | N/A | N/A |
| WATER INJECTION FLOW | GPM | N/A | N/A | N/A |
| EMISSIONS LEVELS | | | | |
| NOX OUTPUT | PPM | −0.03 | 0.14 | −0.20 |
| CO OUTPUT | PPM | 0.00 | 0.00 | 0.00 |
| OTHER | | | | |
| INLET COOLING | ON/OFF | OFF | OFF | OFF |
| INLET TEMPERATURE | DEG. F° | 73 | 0 | 0 |

*FIG. 4*

ORAP LINK
CURRENT UNIT STATUS

| SELECT SITE | SELECT UNITS | |
|---|---|---|
| PLANT A | GT01 | ○ UNIT STATUS |
| PLANT B | GT02 | ⦿ COUNTER READINGS |
| PLANT C | GT03 | ○ UNIT AVAILABILITY |
| PLANT D | | VIEW STATUS |

MAIN MENU

ORAP LINK

CURRENT STATUS

PLANT PRODUCTION DATA

UNIT STATUS

LOGOUT

PLANT A
CURRENT COUNTER READINGS

| | COUNTER READINGS OF LAST MISSION | | |
|---|---|---|---|
| | GT01 | GT02 | GT03 |
| COUNTER READINGS | | | |
| LAST MISSION END | 6/11/2002 3:44:43 PM | 6/11/2002 3:44:09 PM | 6/11/2002 11:12:44 AM |
| CUMULATIVE HOURS | 105 | 157 | 1,034 |
| EQUIVALENT HOURS | 105 | 157 | 0 |
| CUMULATIVE STARTS | 37 | 51 | 29 |
| ABORTED STARTS | 8 | 16 | 16 |
| EQUIVALENT STARTS | 99 | 130 | 49 |
| NUMBER OF TRIPS | | | |
| 51-100% LOAD | 1 | 3 | 1 |
| 31-50% LOAD | 3 | 1 | 0 |
| 16-30% LOAD | 0 | 1 | 0 |
| UP TO 15% LOAD | 0 | 0 | 0 |

*FIG. 5*

ORAP LINK
IGNITION SUMMARY

| MAIN MENU | | | | |
|---|---|---|---|---|
| ORAP LINK | SELECT SITE | SELECT UNITS | SELECTED MISSIONS | SELECTED UNIT |
| ENGINEERING | PLANT A<br>PLANT B<br>PLANT C<br>PLANT D | GT01<br>GT02<br>GT03 | 6/10/2002 6:20:16 AM | GT01 |
| ENGINEERING INFORMATION | AVAILABLE MISSIONS<br>6/11/2002 11:02:37 AM<br>*CLICK TO SELECT MISSION | | *CLICK TO REMOVE MISSION | CONTINUE |
| IGNITION SUMMARY | | | ☐ EXPORT TO EXCEL | |
| LOGOUT | | | VIEW REPORT | |

| POINT NAME | MISSION 1 |
|---|---|
| MISSION START DATE/TIME | 2002-06-10 06:20:16.000 |
| IGNITION DATE/TIME | 2002-06-10 06:21:47.000 |
| COMPRESSOR INLET TEMPERATURE, DEG. F AT IGNITION | 69.484390 |
| SHELL PRESSURE, PSia AT IGNITION | 14.669994 |
| SHELL TEMPERATURE, DEG. F - AT IGNITION | 89.617996 |
| IGNITION SPEED, RPM | 592.437744 |
| IGV ROTARY POSITION, DEGREES - AT IGNITION | 43.303497 |
| FUEL GAS TEMPERATURE, DEG. F - AT IGNITION | 93.899963 |
| FUEL GAS PRESSURE, Psig - AT IGNITION | 467.279846 |
| PILOT STAGE FUEL FLOW @ LIGHTOFF, Kpph - AT IGNITION | 0.041504 |
| STAGE A FUEL FLOW @ LIGHTOFF, Kpph - AT IGNITION | 0.003052 |
| DP - PILOT NOZZLE (OVERFUEL GAGE) Psid - AT IGNITION | -0.060000 |
| DP - STAGE A NOZZLE (OVERFUEL GAGE), Psid - AT IGNITION | 0.020000 |
| PILOT STAGE VALVE DEMAND, % - AT IGNITION | 0.000000 |
| PILOT STAGE VALVE FEEDBACK, % - AT IGNITION | -0.347900 |
| STAGE A VALVE DEMAND, % - AT IGNITION | 0.000000 |
| STAGE A VALVE FEEDBACK, % - AT IGNITION | -0.396728 |
| AVERAGE BLADE PATH TEMPERATURE - AT IGNITION | 97.624557 |
| BLADE PATH SPEED - AT IGNITION | 4.640533 |
| AVERAGE BLADE PATH TEMPERATURE @ 800 RPM | 812.008179 |
| BLADE PATH SPREAD @ 800 RPM | 48.769287 |
| AVERAGE BLADE PATH TEMPERATURE @ 1000 RPM | 1017.519653 |
| BLADE PATH SPREAD @ 1000 RPM | 20.715088 |
| AVERAGE BLADE PATH TEMPERATURE @ 1200 RPM | 1020.712158 |
| BLADE PATH SPREAD @ 1200 RPM | 20.715088 |
| AVERAGE BLADE PATH TEMPERATURE @ 1500 RPM | 1009.958496 |
| BLADE PATH SPREAD @ 1500 RPM | 20.269775 |
| IGNITION SUCCESSFUL (OR) FAILED | SUCCESSFUL |

FIG. 6

ORAP LINK
ENGINEERING INFORMATION

MAIN MENU

ORAP LINK

ENGINEERING

ENGINEERING
INFORMATION

IGNITION
SUMMARY

LOGOUT

SELECT SITE
- PLANT A
- PLANT B
- PLANT C
- PLANT D

SELECT UNITS
- GT01
- GT02
- GT03

SELECTED UNIT
GT01

[CONTINUE]

AVAILABLE POINTS
- 11MBD10CT005S&XQ01 - TURB THRUST BRNG T (HT23), °
- 11MYB01EC001&ZV01 - TURBINE RUNNING,
- 11MYB01EC001&ZV03 - TURBINE RUNNING, COOLDOWN
- 11MBY1DC5601S&XQ01 - TURBINE SPEED, RPM
- 11MBJ10AE201&XG01 - TURNING GEAR STATUS,

BEGIN DATE: 6/10/2002    BEGIN TIME: 12 : 00
END DATE: 6/10/2002      END TIME: 13 : 00

* MAX TIME FRAME IS A WEEK.

SECONDS: ○
MINUTES: ●
HOURS: ○

[VIEW REPORT]

| TIMESTAMP | BLADE PATH TEMP SPREAD, °F | TURBINE SPEED, RPM |
|---|---|---|
| 6/10/02 12:00 | 20281738 | 3601.043457 |
| 6/10/02 12:01 | 20281738 | 3600.494141 |
| 6/10/02 12:02 | 20021973 | 3599.944824 |
| 6/10/02 12:03 | 21.296875 | 3599.944824 |
| 6/10/02 12:04 | 21.197754 | 3600.494141 |
| 6/10/02 12:05 | 21.197754 | 3599.67041 |

ORAP LINK
OPERATING REPORTS

| MAIN MENU | | SELECT SITE | | | | | SELECT REPORT | | | DEFAULT DATE: 6/10/2002 | |
|---|---|---|---|---|---|---|---|---|---|---|---|
| ORAP LINK | | PLANT A / PLANT B / PLANT C / PLANT D | | | | | ● DAILY / ○ SUMMARY | | | VIEW REPORT | |

| OPERATIONS | HOUR ENDING | CT TESTING | ENERGY GENERATED (MWh) | CT TESTING | ENERGY GENERATED (MWh) | CT TESTING | ENERGY GENERATED (MWh) | TEST ENERGY GENERATED (MWh) | DISPATCHED ENERGY GENERATED (MWh) | DISPATCH ORDER (MWh) | POWER IMBALANCE | COMMENTS |
|---|---|---|---|---|---|---|---|---|---|---|---|---|
| EQUIVALENT STARTS AND HOURS | 1 | ☐ | 0 | ☐ | 0 | ☐ | 0 | 0 | 0 | 0 | 0 | |
| | 2 | ☐ | 0 | ☐ | 0 | ☐ | 0 | 0 | 0 | 0 | 0 | |
| | 3 | ☐ | 0 | ☐ | 0 | ☐ | 0 | 0 | 0 | 0 | 0 | |
| PRODUCTION REPORTS | 4 | ☐ | 0 | ☐ | 0 | ☐ | 0 | 0 | 0 | 0 | 0 | |
| | 5 | ☐ | 0 | ☐ | 0 | ☐ | 0 | 0 | 0 | 0 | 0 | |
| | 6 | ☐ | 6.18 | ☐ | 13.14 | ☐ | 0 | 0 | 0 | 0 | 0 | |
| LOGOUT | 7 | ☐ | 136.91 | ☐ | 169.53 | ☐ | 0 | 0 | 19.32 | 0 | 19.32 | |
| | 8 | ☐ | 144.05 | ☐ | 170.84 | ☐ | 0 | 0 | 306.44 | 312 | -5.56 | |
| | 9 | ☐ | 149.55 | ☐ | 167.35 | ☐ | 0 | 0 | 314.89 | 312 | 2.89 | |
| | 10 | ☐ | 165.43 | ☐ | 151.41 | ☐ | 0 | 0 | 316.9 | 312 | 4.9 | |
| | 11 | ☐ | 164.08 | ☐ | 153.03 | ☐ | 0 | 0 | 316.84 | 312 | 4.84 | INLET FOGGING COMMISSION |
| | 12 | ☐ | 163.43 | ☐ | 153.1 | ☐ | 0 | 0 | 317.11 | 312 | 5.11 | INLET FOGGING - LOAD |
| | 13 | ☐ | 162.67 | ☐ | 154 | ☐ | 0 | 0 | 316.53 | 312 | 4.53 | VARYING AROUND A LOT! |
| | 14 | ☐ | 164.45 | ☐ | 153.94 | ☐ | 0 | 0 | 316.67 | 312 | 4.67 | |
| | 15 | ☐ | 162.65 | ☐ | 154.24 | ☐ | 0 | 0 | 318.39 | 312 | 6.39 | |
| | 16 | ☐ | 163.61 | ☐ | 155.13 | ☐ | 0 | 0 | 316.89 | 312 | 4.89 | |
| | 17 | ☐ | 166.61 | ☐ | 151.5 | ☐ | 0 | 0 | 318.74 | 312 | 6.74 | |
| | 18 | ☐ | 166.82 | ☐ | 150.96 | ☐ | 0 | 0 | 318.11 | 312 | 6.11 | |
| | 19 | ☐ | 167.6 | ☐ | 150.35 | ☐ | 0 | 0 | 317.78 | 312 | 5.78 | |
| | 20 | ☐ | 168.32 | ☐ | 149.95 | ☐ | 0 | 0 | 317.95 | 0 | 317.95 | |
| | 21 | ☐ | 169.54 | ☐ | 149.71 | ☐ | 0 | 0 | 318.27 | 0 | 318.27 | |
| | 22 | ☐ | 159.47 | ☐ | 136.56 | ☐ | 0 | 0 | 319.25 | 0 | 319.25 | |
| | 23 | ☐ | 5.14 | ☐ | 2.34 | ☐ | 0 | 0 | 296.03 | 0 | 296.03 | |
| | 24 | ☐ | | ☐ | | ☐ | 0 | 0 | 7.48 | 0 | 7.48 | |

FIG. 9

ORAP LINK
STARTS AND HOURS

| SELECT SITE | | BEGIN DATE: 1/18/2003 |
| --- | --- | --- |
| | | END DATE: 3/10/2003 |
| | | VIEW REPORT |

COMBINED-CYCLE - STARTS AND HOURS SUMMARY

DATA RANGE: 1/18/2003 TO 3/10/2003

| | OPERATING HOURS | |
| --- | --- | --- |
| | GT01 | GT02 |
| OPERATING HOURS | 160.89 | 57.89 |
| COMBUSTION INSPECTION FACTORED HOURS | 160.89 | 57.89 |
| HOT GAS PATH INSPECTION/MAJOR OVERHAUL FACTORED HOURS | 160.89 | 145.07 |
| ROTOR MAINTENANCE FACTORED HOURS | 160.89 | 34.89 |
| ***FACTORED HOURS ARE CALCULATED PER GER-3620F | | |

| | STARTS | |
| --- | --- | --- |
| | GT01 | GT02 |
| NORMAL STARTS | 4 | 8 |
| COMBUSTION INSPECTION FACTORED STARTS | 3 | 4 |
| HOT GAS PATH INSPECTION/MAJOR OVERHAUL FACTORED STARTS | 3 | 4 |
| ROTOR MAINTENANCE FACTORED STARTS | 4 | 4 |
| ***FACTORED STARTS ARE CALCULATED PER GER-3620F | | |

MAIN MENU

ORAP LINK

OPERATIONS

DAILY OPERATING REPORT

EQUIVALENT STARTS AND HOURS

STARTING RELIABILITY

SUMMARY OPERATING REPORT

TRIP SUMMARY

LOGOUT

*FIG. 10*

SYSTEM AND METHOD FOR CALCULATING PART LIFE

This application claims priority from provisional application serial No. 60/408,428 filed on Sep. 5, 2002 now abandoned, entitled "ORAP LINK data monitoring, analysis and storage engine."

BACKGROUND OF THE INVENTION

1. Technical Field

The present invention relates generally to processing control data, and more particularly relates to managing reliability data collected from an industrial plant.

2. Related Art

Like most large-scale industrial operations, modern power plants require a tremendous amount of scheduled maintenance to operate at peak efficiency. Typical maintenance involves inspecting turbine parts, analyzing inspection data, calculating expected lifespan of parts, and replacing and/or servicing parts. Given the costs involved in providing such services, effectively managing the maintenance processes can have a substantial impact on plant profitability.

One specific challenge with servicing power plants involves how to collect and utilize data necessary to make intelligent maintenance decisions, such as when parts should be replaced, etc. However, because of the number of parts and variables that exist for maintaining a complicated system such as a gas turbine, automation of the maintenance process is a complex problem. While systems exist for tracking parts and maintenance histories (i.e., static data), the life expectancy of each component is going to depend greatly on numerous operational characteristics that the component was subject to (e.g., hours of operation, starts, etc.). Therefore, tracking parts life requires measuring and tracking not only the parts themselves, but also the operational characteristics of hundreds or thousands of parts, which represents a significant challenge.

Power plants generate thousands of raw operational data points (i.e., dynamic data) each second including, e.g., temperature measurements, turbine speed, trips, hours of operation, fuel consumption, startup information, etc. The mere act of capturing and storing thousands of raw data points in a near real-time environment can require significant computing resources. This, combined with the need to provide analysis and storage tools to convert the data into some useful information creates significant data processing obstacles.

Accordingly, in order to provide an automated and comprehensive maintenance program, all reliability data including both dynamic data (operational information) and static data (part information and general maintenance records) must be carefully tracked and incorporated into any reliability analysis. Moreover, even if such comprehensive reliability data exists, such records may exist only in manual logs and/or in disparate electronic formats. Accordingly, numerous challenges exist with respect to effectively maintaining large-scale control operations, such as power plants. Without an automated system for more effectively managing reliability information, maintaining such plants will remain an inefficient process.

SUMMARY OF THE INVENTION

The present invention addresses the above-mentioned problems, as well as others by providing comprehensive data processing solutions for reliability data in plant environments such as power generation plants. In a first aspect, the invention provides a data collection engine for collecting a stream of dynamic data from a plant, comprising: a first computer process for receiving the dynamic data and for saving the dynamic data as database records in a series of log files within a file folder; and a second computer process for reading the database records from the log files, and storing the database records in a database.

In a second aspect, the invention provides a method for collecting a stream of dynamic plant data, comprising: using a first computer process to receive the dynamic plant data and to save the dynamic plant data as database records in a series of log files within a file folder; and using a second computer process to read the database records from the log files and store the database records in a database.

In a third aspect, the invention provides a system for utilizing reliability data from a plant to dynamically calculate an expended life for a selected part, comprising: a central database for storing service data for parts within the plant; a data collection engine for dynamically collecting operational data from the plant in a near real-time manner; and a lifetime calculation engine for implementing a lifetime calculation equation for the selected part, wherein the lifetime calculation equation utilizes the service data and the operational data to determine the expended life of the selected part.

In a fourth aspect, the invention provides a method of utilizing reliability data from a plant to dynamically calculate an expended life for a selected part, comprising: storing service data for plant parts; dynamically collecting operational data from the plant in a near real-time manner; and calculating the expended life of the selected part using a lifetime calculation equation for the selected part, wherein the lifetime calculation equation utilizes the service data and the operational data.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a screen shot of dynamically displayed plant operational data in accordance with the present invention.

FIG. 6 depicts a screen shot of dynamically displayed ignition summary data in accordance with the present invention.

DETAIL DESCRIPTION OF THE INVENTION

1. Overview

The present invention describes a comprehensive system for collecting, analyzing, and presenting (collectively referred to as "managing") reliability data for large-scale control systems. While the invention is described with reference to maintenance related data for a power system, it is understood that the concepts and inventive features described herein could be applied to managing any type of reliability data for any large-scale control system. For the purposes of this description, reliability data includes static data, e.g., parts information, service information, parts history, service history, maintenance schedules, etc., and dynamic data, e.g., operational information such as turbine speed, temperature, operating status, etc.

Figure 1:
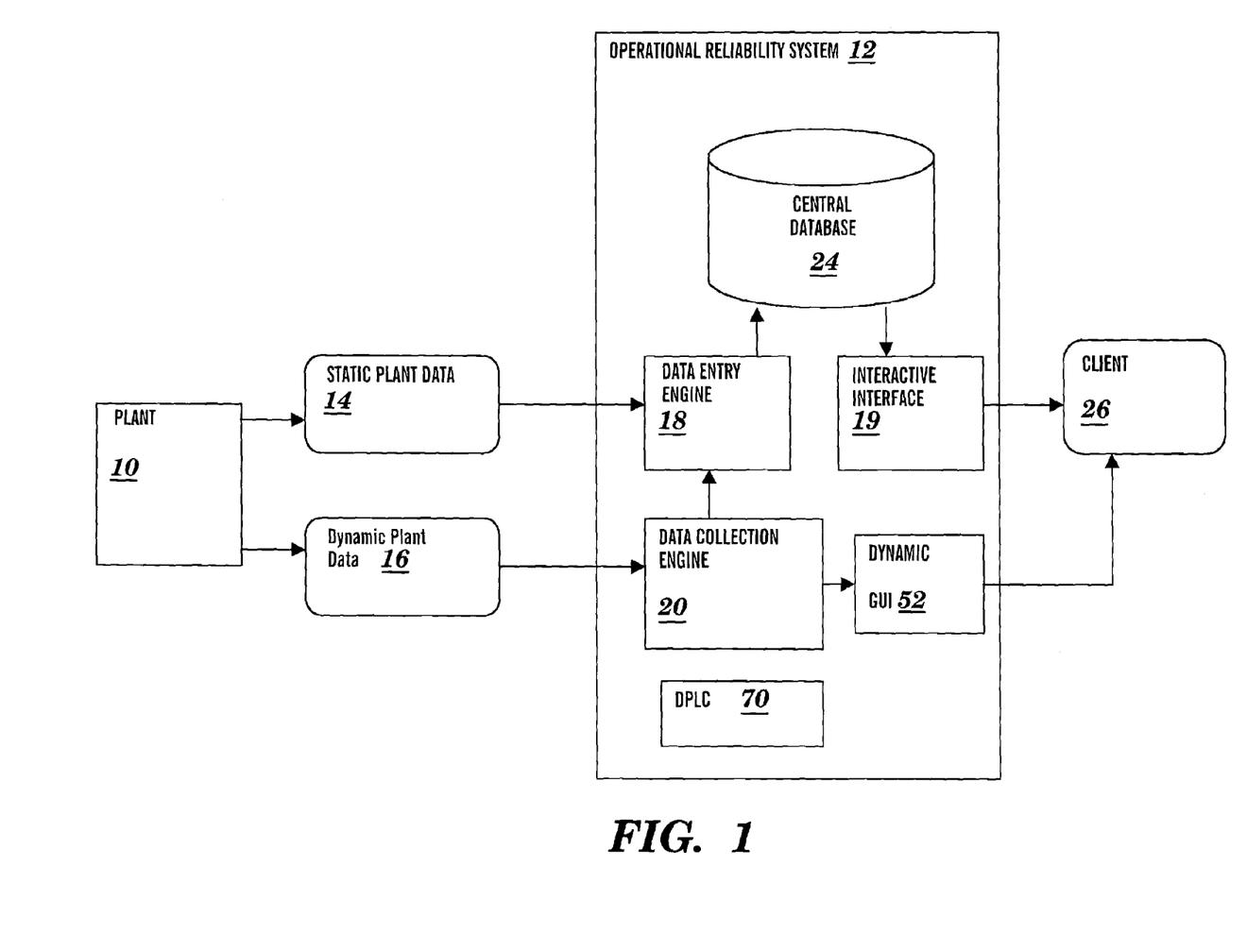
FIG. 1 depicts an operational reliability system for managing reliability data from a plant in accordance with the present invention.

Referring now to FIG. 1, an operational reliability system 12 for managing reliability data from a plant 10 is shown. In this exemplary embodiment, data can be collected by system 12 either as static plant data 14 or as dynamic plant data 16. Static plant data 14 generally comprises parts or service data that does not change with respect to time, or only changes at infrequent intervals. Examples may include: (1) data collected by plant personnel to record ongoing maintenance and operations data, e.g., part removal and installation data, counter/age readings, etc.; (2) "as-built" configuration data that details parts, serial numbers, and description; (3) data collected by field service technicians to record major maintenance event data, etc. Static plant data 14 may be collected by system 12 in any manner, including via the web, via replication from a remote program or database, via a network batch job, etc. Static plant data 14 is inputted into operational reliability system 12 via a data entry engine 18, which stores the data to a central database 24.

Data in the central database 24 is made available to the client 26 in a non-dynamic fashion via an interactive interface 19. Interactive interface 19 provides various analysis, reporting and display systems for displaying data. Examples include parts tracking, service history, etc. Client 26 may access interactive interface 19 in any manner, e.g., via a network such as the Internet, etc.

Dynamic plant data 16 generally comprises raw operational data flowing directly from the plant 10 without human intervention. Dynamic plant data 16 captures various operational characteristics of plant 10 as a continuous stream of data. Dynamic plant data 16 may includes power output readings, fuel consumption readings, emissions readings, operational status, temperature readings, counter readings, trip data, ignition and start data, turbine speed, etc. In this exemplary embodiment, dynamic plant data 16 is delivered to system 12 via a dedicated network and is received via a data collection engine 20. Details of the data collection engine 20 are described below with reference to FIG. 2.

In addition to capturing the dynamic plant data 16, data collection engine 20 transforms (i.e., filters, analyzes and processes) the dynamic plant data 16 into a format that can be efficiently utilized by the operational reliability system 12. Specifically, the transformed dynamic data can be dynamically presented to the client 26 in a graphical user interface (GUI) 52 as near real-time operational data for the plant 10. In addition, the transformed dynamic data can be stored by the data entry engine 18 in central database 24.

Finally, operational reliability system 12 may include a dynamic part life calculation (DPLC) system 70 that is capable of dynamically calculating and outputting expended life information for parts. This feature is described in detail below with respect to FIG. 9.

2. Dynamic Data Collection

Figure 2:
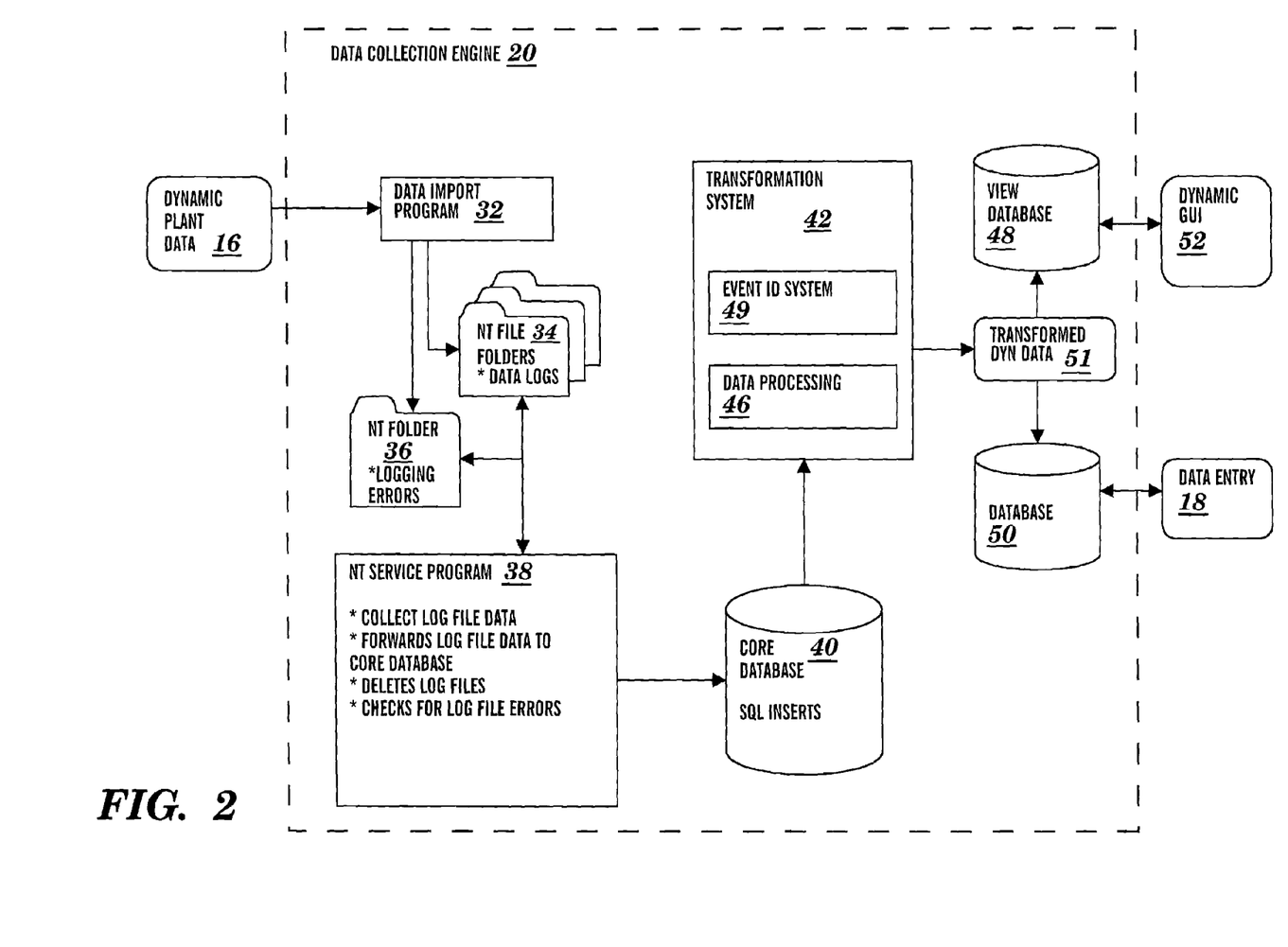
FIG. 2 depicts a data collection engine for collecting and processing dynamic plant data in accordance with the present invention.

As noted above, operational reliability system 12 includes a data collection engine 20 for capturing dynamic plant data 16. Because of the large amount of near real-time dynamic data involved (e.g., thousands of data points each second), engine 20 must be able to capture, analyze and process the dynamic plant data 16 in an efficient manner. FIG. 2 describes an embodiment utilizing two separate computer processes for handling this task.

Dynamic plant data 16, which generally comprises a stream of binary data, is captured from plant 10 via a control system interface, and passed along an Ethernet connection to a remote computer system having data collection system 20 operating thereon. Within data collection engine 20, dynamic plant data 16 is temporarily buffered into data logs within one or more NT™ file folders 34. Specifically, dynamic plant data 16 is collected and passed to the NT file folders 34 using a "high-priority" computer process comprised of a data import program 32. Data import program 32 may be implemented, for instance, as an application programmers interface (API) using a combination of: (1) off-the-shelf data collection software that allows access through its native API libraries to a control system interface via standard drivers; and (2) a customized visual basic program. In addition, the data import program 32 can be configured such that any errors that occur are forwarded to a separate NT file folder 36 and stored as logging errors.

In an exemplary embodiment, data import program 32 dynamically creates SQL insert statements that capture all of the data points from the dynamic plant data 16. The insert statements are stored in a series of log files within an NT file system directory specified by data import program 32. Data import program 32 continuously logs the data in a "high priority" mode of operation, so that there is no interruption in the collection process. An example of an SQL insert record that provides date, time, identifier and value data is as follows:

INSERT INTO analog_plant (point_datetime, point_id, local_entity_id, point_values) VALUES ('Aug. 28, 2002 3:42:14 PM',328,'1',65).

In a separate computer process, an NT service program 38 is run at a relatively lower priority to move the data logs to a core database 40. In particular, NT service program 38 checks the specified directory at specified time intervals for log files. If a log file exists, NT service program 38 opens the log file, reads the data, and submits it to the core database 40. After the submission is complete, NT service program 38 deletes the log file and moves on to a next log file. If no log file exists, NT service program 38 will idle until the data import program 32 writes another file to the specified directory. If NT service program 38 experiences an error during the submission of data to core database 38, the log file will be moved to a second directory (i.e., folder 36) for further investigation, preserving the data, but not hindering the ongoing process.

If the core database 40 becomes unavailable, or other unexpected issues arise causing the NT service program 38 to delay operations, no data is lost. The log files will continue to be written by the "higher priority" data import program 32 until any issues with respect to the NT service program 38 are corrected. Upon correction, the data can be written to the core database 40, thereby ensuring reliability and stability of the data collection engine 20. The data in this database is typically kept for about thirty days, although this can be customized and extended to a much longer time period as needed.

While the embodiment with reference to FIG. 2 is implemented using SQL insert statements, an NT file system, and an NT Service Program 38, it is understood that other database formats, operating systems, file structures and service programs could be utilized to perform the same functions without departing from the scope of the invention.

3. Data Transformation

After the data is stored in the core database, it is analyzed and processed by a transformation system 42 to generate transformed dynamic data 51. Transformation system 42 includes an event identification system 49 to identify core database inserts for specific events (i.e., "critical data points"). In particular, each data point is evaluated against certain criteria, as well as other data points, to determine if the information should be kept and/or processed. Critical data points may include any data points deemed important enough to save, display and/or process. Examples may include: critical events such as starts, ignition data, breaker closure, shutdowns, trips, aborted starts, etc.; operating states such as in startup, full speed no load, operating at base load, in shutdown, etc.; time based measurements of critical life parameters such as cycles and operating time at different load and temperature levels; operational parameters, such as fluid temperatures, turbine speeds, emissions, fuel flows, power output, etc., which will be collected at predefined intervals based on the unit's current operating status. Transformed dynamic data 51 is both passed along to a view database 48 where the data is replicated for a dynamic graphical user interface (GUI) 52 and to a database 50 for replication into the central database 24 via data entry system 18.

Database 50 contains transformed data that is used by the client to report data into the data entry engine 18. This transformed data provides a significant portion, e.g., about 75%, of the total input data required by the client and therefore decreases the time requirements placed on the plant personnel, while enhancing the accuracy of the resulting data. The data may be kept in database 50 permanently.

Figure 4:
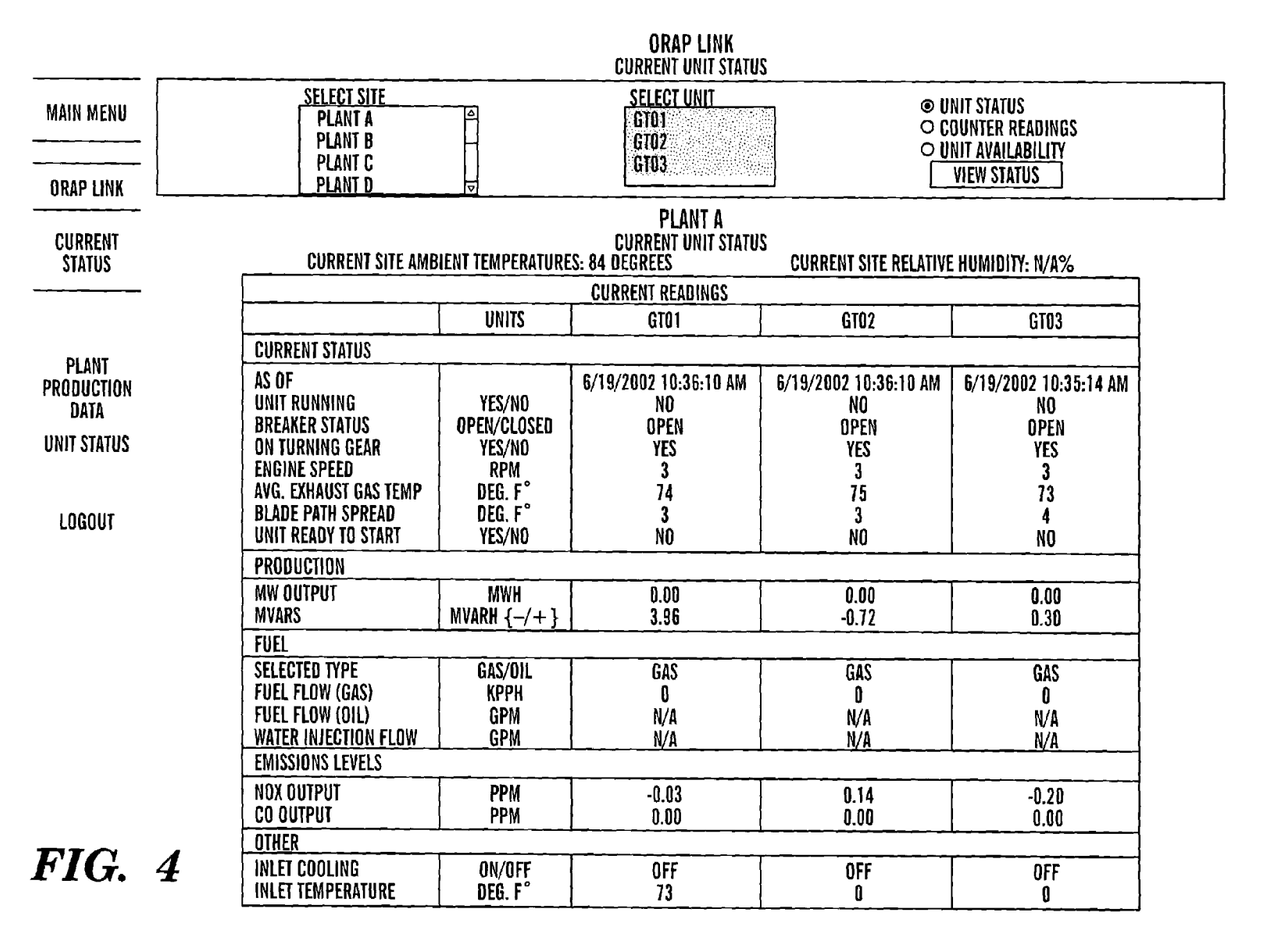
FIG. 4 depicts a screen shot of dynamically displayed plant status data in accordance with the present invention.

In some instances, critical data points are simply presented/saved as is. For instance, FIG. 3 depicts an exemplary screenshot of a viewing GUI 52 showing various critical data points (i.e., plant production data) for various plants within a single company. Critical data points, such as current power output (MW's), fuel type and burn rate are displayed and regularly updated in a near real-time fashion. FIG. 4 depicts a more detailed view of various readings for three units (GT01, GT02, GT03) at a single plant.

Figure 5:
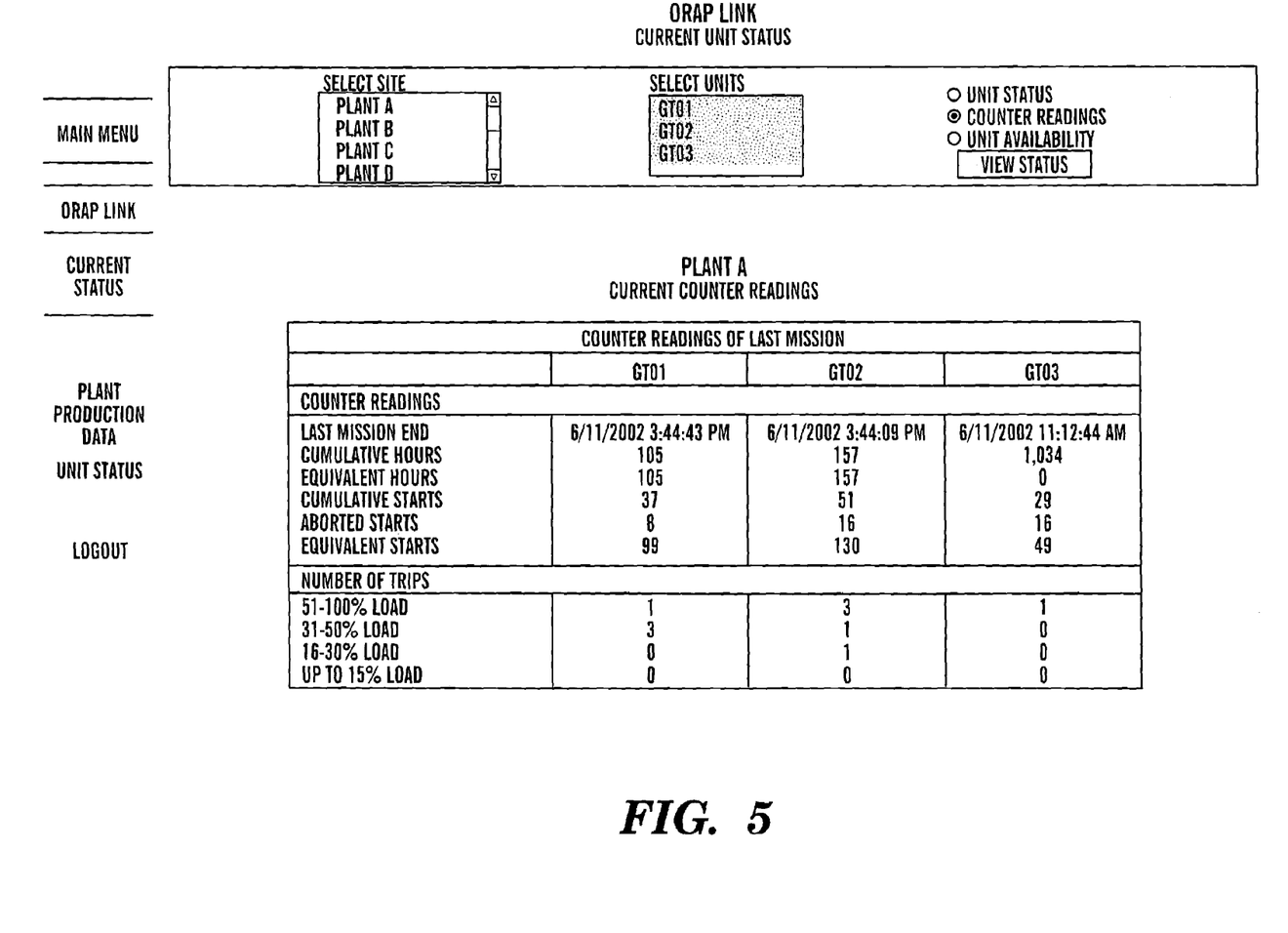
FIG. 5 depicts a screen shot of dynamically displayed plant status data in accordance with the present invention.
Figure 7:
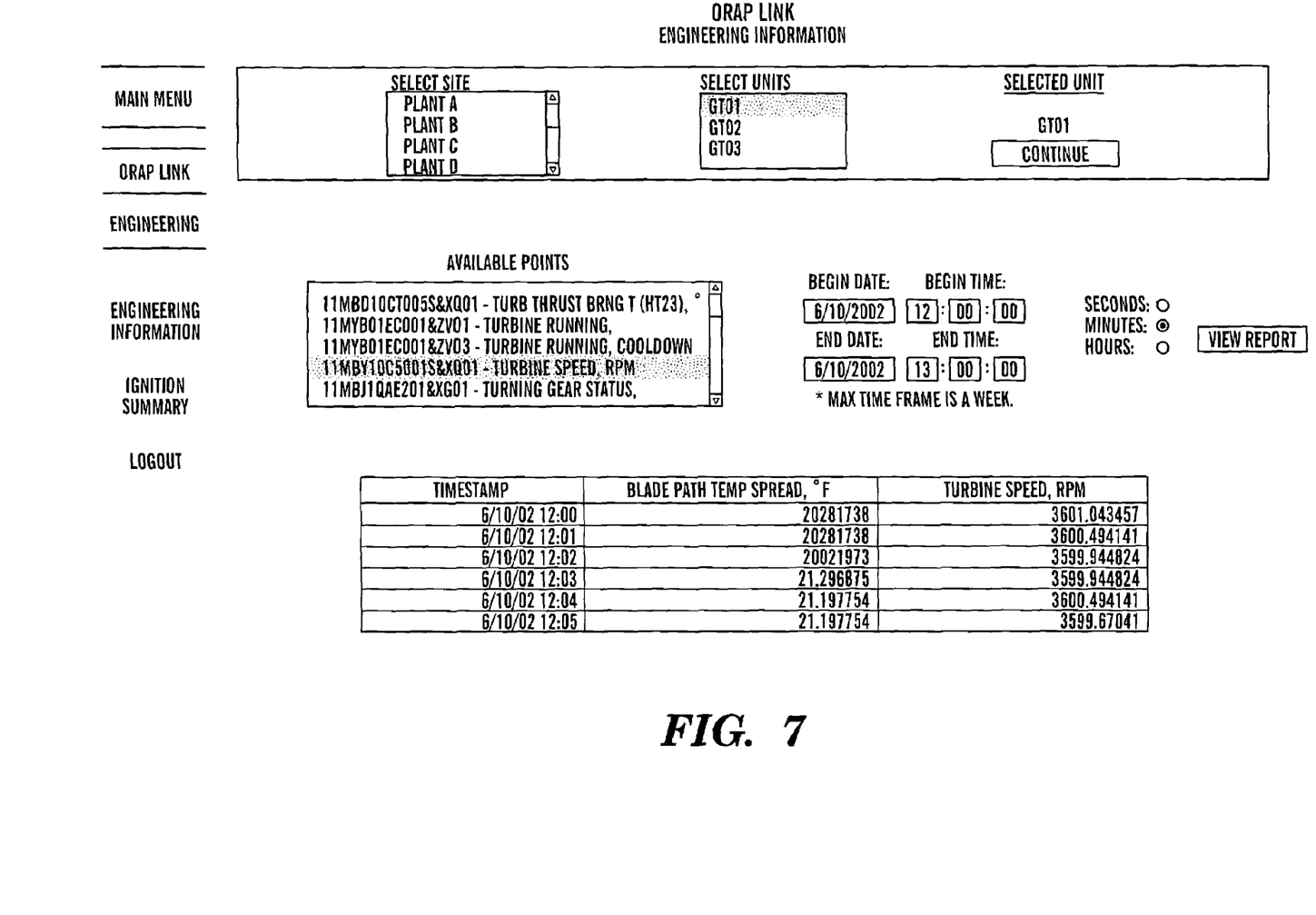
FIG. 7 depicts a screen shot of dynamically displayed engineering data in accordance with the present invention.
Figure 8:
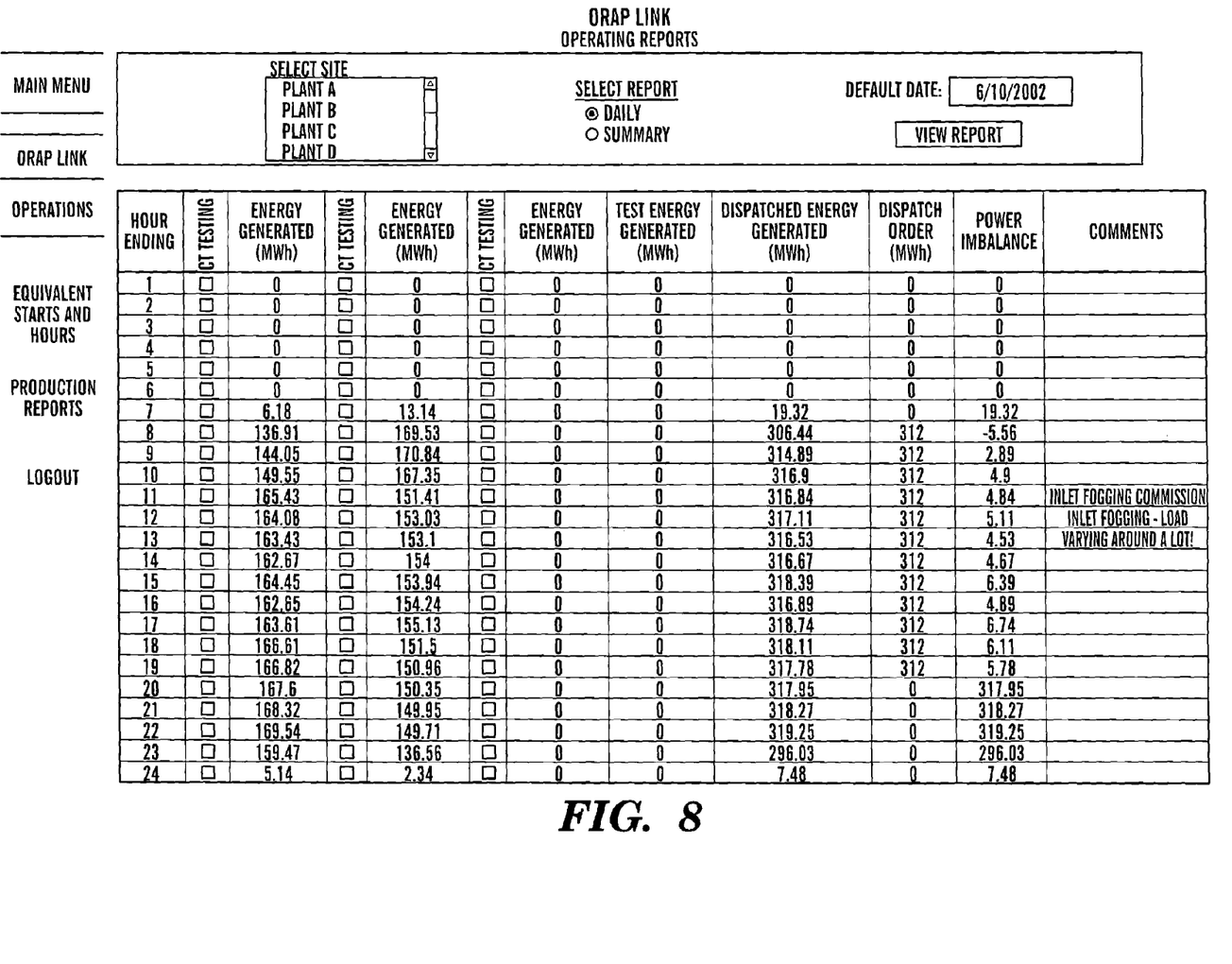
FIG. 8 depicts a screen shot of an operating report for a span of time in accordance with the present invention.

In other cases, the critical data points are further processed by data processing system 46 (FIG. 2) before being passed to the view database 48 and database 50. For example, critical data points may be used to calculate cumulative characteristics, such as total time on-line, total fuel consumption, number of starts, number of trips, energy generated over a span of time, etc. FIG. 5 depicts cumulative counter readings for the previous missions of the three units (GT01, GT02, GT03). Critical data points may also be processed to provide reports, such as an ignition summary (FIG. 6), engineering data such as blade path temperatures and turbine speeds (FIG. 7), and daily operating reports (FIG. 8).

In essence, transformation system 42 selects and processes critical data points. The resulting transformed dynamic data 51 can then be presented to the end-user (e.g., client) in near real-time via a dynamic GUI 52. From the dynamic GUI 52, the end-user is able to dynamically assess reliability data from a remotely located plant. In certain applications, dynamic GUI 52 can be configured to display reliability data from a plurality of plants, thereby allowing an end-user to monitor multiple disparate plant locations from a single site.

Expended Life Calculations

Figure 9:
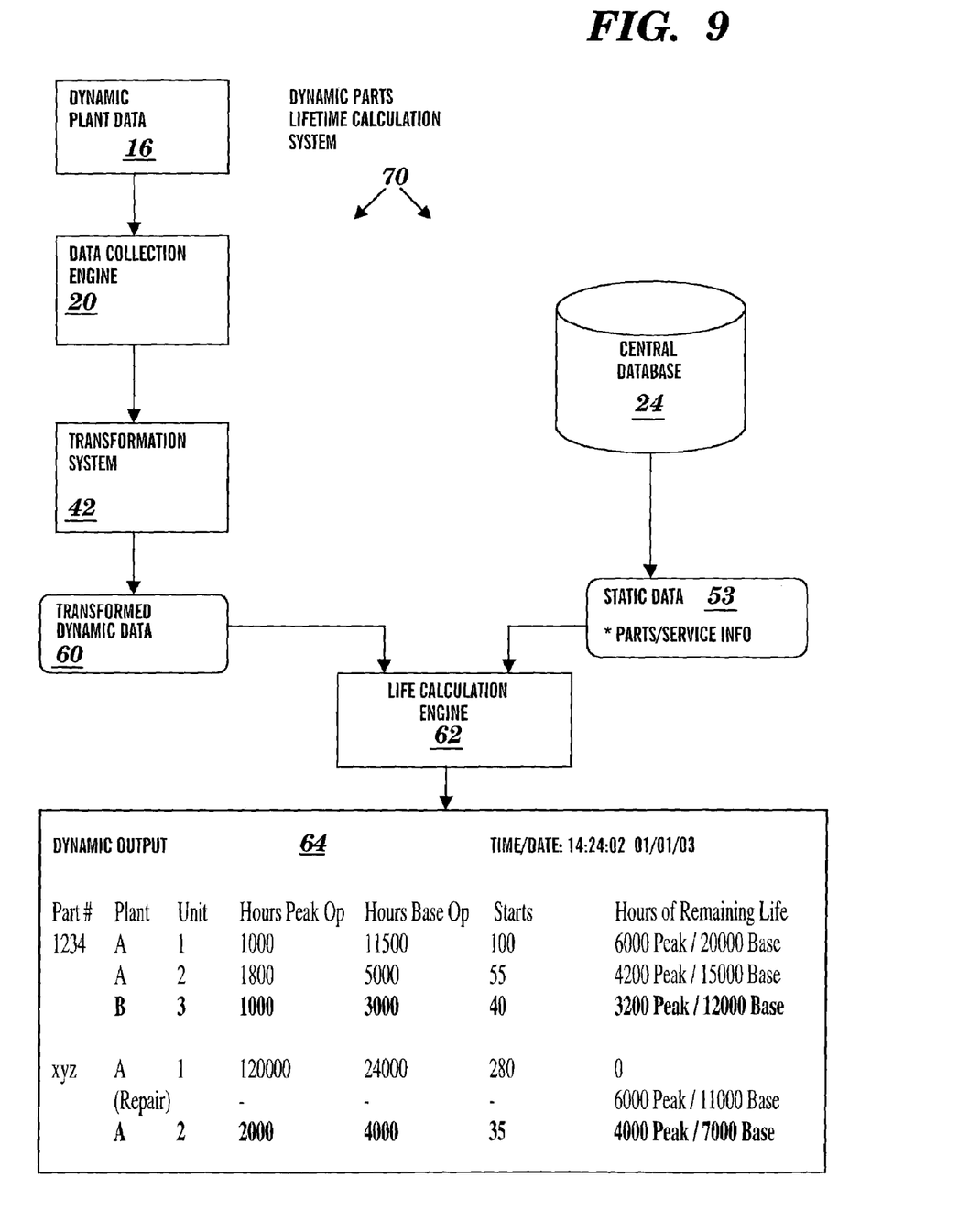
FIG. 9 depicts a system for dynamically calculating and outputting expended life data for parts within a plant in accordance with the present invention.

As noted above with reference to FIG. 1, Operational Reliability System 12 may include a dynamic part life calculation (DPLC) system 70 that is capable of dynamically calculating and outputting expended life information for parts. A more detailed DPLC system 70 is shown in FIG. 9.

At the heart of DPLC system 70 is life calculation engine 62 that utilizes both transformed dynamic data 60 and static data 53 to provide a dynamic output 64 that details expended life estimations for parts. It should be understood that for the purposes of this invention, the term expended life is broadly defined to include any information that describes or estimates an amount of used life/usefulness or remaining life/usefulness of apart.

Transformed dynamic data 60 may be obtained as described above, i.e., from dynamic plant data 16 collected via data collection engine 20, and processed via transformation system 42. Static data 53 may be obtained from central database 24, and will typically include information such as part number, installation dates, maintenance history, etc.

Life calculation engine 62 combines the dynamic operational information in the transformed dynamic data with the parts and service information in the static data to calculate expended life. For example, a given part, e.g., "1234," installed in plant 10 can be identified, along with its associated installation date and service history across all other plants and units in which it was installed, from the static data 53. Transformed dynamic data 60 can then be used to provide any relevant operational information, such as hours of peak operation, hours of base operations, number of starts, number of trips, etc. A lifetime calculation equation can then be used to calculate and output expended life for the part dynamically in a near real-time manner.

In the exemplary embodiment of FIG. 9, dynamic output 64, which may include a date and time that the output was created, details two parts, "1234" and "xyz." In this example, dynamic output 64 shows expended life (i.e., hour of peak and base operations), number of starts, and hours of remaining life for the two parts. In this case, each part is tracked by plant and unit. Thus, part 1234 is shown to have been used in Plant A Unit 1, Plant A Unit 2, and Plant B Unit 3. Usage information (i.e., hours, starts, etc.) is shown for each part over time, with the current location and usage information being shown in bold (i.e., Plant B Unit 3). Thus, part 1234 currently has 3200 peak and 12000 base hours of life remaining. Part xyz shows similar information, except that a repair was made to the part, which added 6000 peak and 11000 base hours. Part xyz currently has 4000 peak and 7000 base hours remaining.

Obviously, different types of expended life information can be presented without departing from the scope of the invention. Moreover, dynamic output 64 could be provided in any medium or format, e.g., within dynamic GUI 52, as a printed report, etc. A useful feature of DPLC system 70, however, is that expended life information can be made available for potentially any part within a plant "on demand" in a near real-time fashion.

As noted, life calculation engine 62 requires lifetime calculation equations to calculate expended life. Such equations are known in the art, and can be readily implemented. Most equations provide some interval (number of hours, starts, etc.) for which the part should be inspected, repaired or replaced. For instance, an "hours based" rotor life calculation for a GE® Frame MS7001/9001F and FA rotor is defined as follows:

$$\text{Maintenance Factor} = \frac{H + 2*P + 2*TG}{H + P}$$

$$\text{Rotor Maintenance Interval} = \frac{144000}{\text{Maintenance Factor}}$$

Where: H=base load hours, P=peak load hours, and TG=hours on turning gear. In this case, a maintenance interval can be readily calculated and outputted. In addition, the remaining life or unused portion of the maintenance interval can be calculated and output. Other criterion, such as starts-based criterion for measuring a rotor maintenance interval could also be utilized and output.

Figure 10:
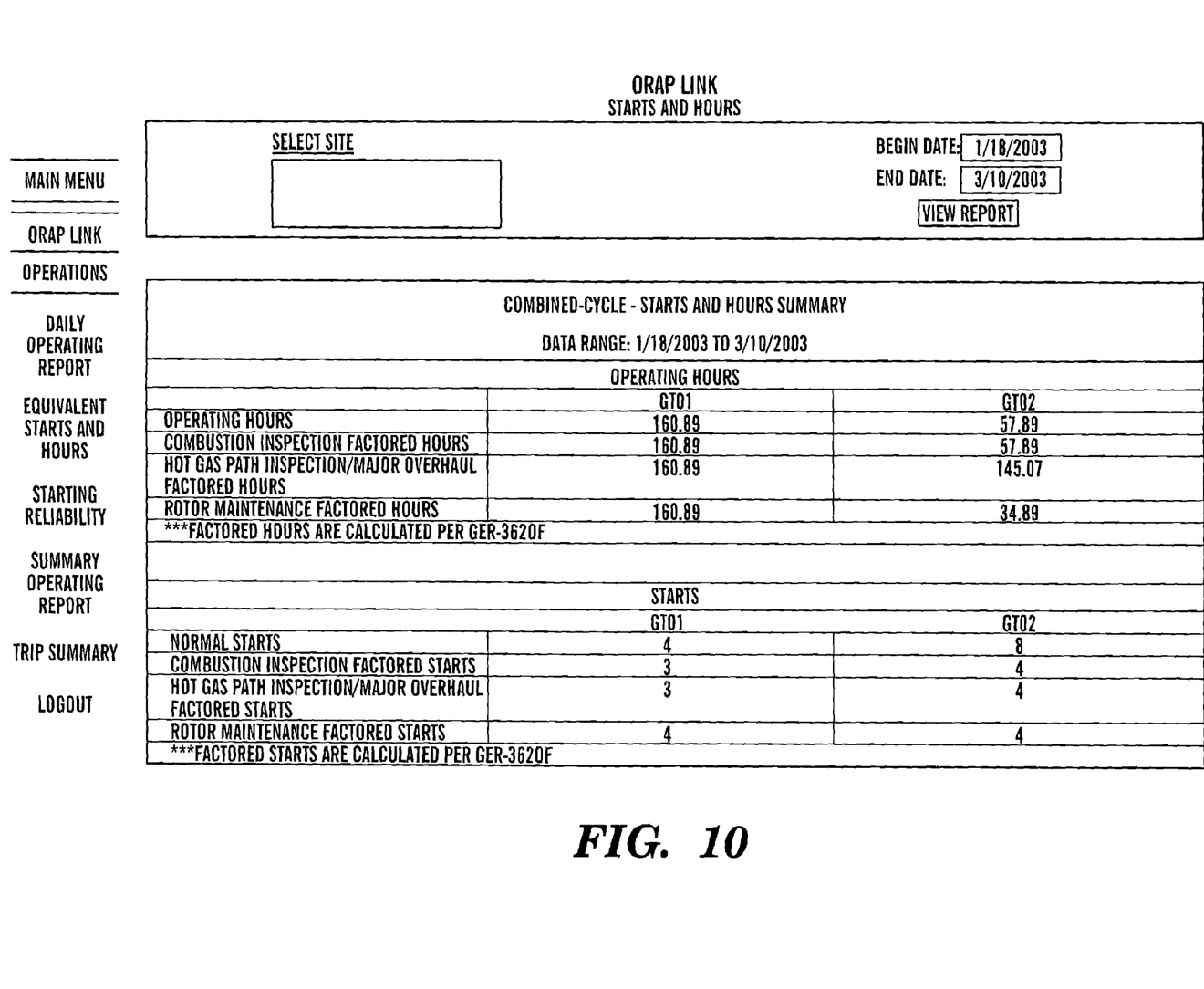
FIG. 10 depicts a screenshot of dynamically calculated and displayed equipment age data for parts within a plant in accordance with the present invention.

FIG. 10 depicts a screenshot of dynamically calculated and displayed equivalent equipment age data in terms of hours and starts for two units GT01 and GT02. This information represents the expended life of the entire unit and, when combined with previous unit inspection data, can be used to determine and plan the future dates at which different inspections and module/part replacements must be performed. This particular example shows the unit age in terms of Factored Hours and Factored Starts equations, but the formula used to determine age might vary from unit to unit depending on the experiences of the owner/operator, the manufacturer of the equipment, and the results of each subsequent inspection.

It is also understood that the systems, functions, mechanisms, methods, and engines described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A system embodied in a computer readable memory for utilizing reliability data from a plant to dynamically calculate an expended life for a selected part, comprising:
   a central database for storing service data for different parts of a unit within the plant, wherein the service data includes installation data and a service history of the different parts including usage information from a plurality of different units in which a given part was installed;
   a data collection engine for dynamically collecting a continuous stream of operational data from the plant, wherein the operational data is collected, processed and stored independently from the central database;
   a lifetime calculation engine for implementing a lifetime calculation equation for the selected part, wherein the lifetime calculation equation utilizes the service data and the continuous stream of operational data obtained from the data collection engine without human intervention to dynamically calculate the expended life of the selected part in a continuous and near real-time manner; and
   an output for dynamically displaying the expended life of the selected part.

2. The system of claim 1, wherein the operational data includes information selected from the group consisting of: hours of operation, number of starts, number of trips, and operating temperature.

3. A method of utilizing reliability data from a plant to dynamically calculate an expended life for a selected part, comprising:
   storing in a database static data for parts of a unit within a plant, wherein the static data includes past usage data for individual parts tracked across a plurality of different units;
   collecting and storing a continuous stream of dynamic operational data from the plant in a near real-time manner without human intervention;
   calculating the expended life of the selected part using a lifetime calculation equation for the selected part, wherein the lifetime calculation equation utilizes the static data and the continuous stream of dynamic operational data without human intervention and wherein the expended life is continuously recalculated in near real-time in response to changes in the continuous stream of dynamic operational data; and
   outputting expended life information.

4. The method of claim 3, wherein the expended life information is dynamically outputted to display continuous recalculations of the expended life.

* * * * *